(12) United States Patent
Yu et al.

(10) Patent No.: US 12,241,138 B2
(45) Date of Patent: Mar. 4, 2025

(54) WEAR RESISTANT STEEL MATERIAL WITH EXCELLENT CUT CRACK RESISTANCE AND METHOD OF MANUFACTURING SAME

(71) Applicant: POSCO, Pohang-si (KR)

(72) Inventors: Seng-Ho Yu, Pohang-si (KR); Nam-Young Cho, Seoul (KR)

(73) Assignee: POSCO, Pohang-si (KR)

( * ) Notice: Subject to any disclaimer, the term of this patent is extended or adjusted under 35 U.S.C. 154(b) by 0 days.

(21) Appl. No.: 17/787,124

(22) PCT Filed: Dec. 16, 2020

(86) PCT No.: PCT/KR2020/018392
§ 371 (c)(1),
(2) Date: Jun. 17, 2022

(87) PCT Pub. No.: WO2021/125763
PCT Pub. Date: Jun. 24, 2021

(65) Prior Publication Data
US 2023/0052839 A1 Feb. 16, 2023

(30) Foreign Application Priority Data
Dec. 19, 2019 (KR) .................. 10-2019-0170859

(51) Int. Cl.
| | | |
|---|---|---|
| *C22C 38/00* | (2006.01) | |
| *C21D 6/00* | (2006.01) | |
| *C21D 8/02* | (2006.01) | |
| *C21D 9/46* | (2006.01) | |
| *C22C 38/02* | (2006.01) | |
| *C22C 38/04* | (2006.01) | |
| *C22C 38/06* | (2006.01) | |
| *C22C 38/22* | (2006.01) | |
| *C22C 38/24* | (2006.01) | |
| *C22C 38/26* | (2006.01) | |

(52) U.S. Cl.
CPC ............ *C21D 9/46* (2013.01); *C21D 6/002* (2013.01); *C21D 6/005* (2013.01); *C21D 6/008* (2013.01); *C21D 8/0205* (2013.01); *C21D 8/0226* (2013.01); *C21D 8/0263* (2013.01); *C22C 38/002* (2013.01); *C22C 38/02* (2013.01); *C22C 38/04* (2013.01); *C22C 38/06* (2013.01); *C22C 38/22* (2013.01); *C22C 38/24* (2013.01); *C22C 38/26* (2013.01); *C21D 2211/002* (2013.01); *C21D 2211/008* (2013.01)

(58) Field of Classification Search
CPC ....... C22C 38/002; C22C 38/02; C22C 38/04; C22C 38/06; C22C 38/22; C22C 38/24; C22C 38/26
USPC .......................................................... 428/544
See application file for complete search history.

(56) References Cited

U.S. PATENT DOCUMENTS

| | | | |
|---|---|---|---|
| 2014/0096875 A1* | 4/2014 | Ueda | ................... C22C 38/22 |
| | | | 148/330 |
| 2014/0251513 A1 | 9/2014 | Kami et al. | |
| 2015/0225822 A1 | 8/2015 | Miura et al. | |
| 2016/0010191 A1 | 1/2016 | Li et al. | |
| 2016/0208352 A1 | 7/2016 | Suikkanen et al. | |
| 2019/0010571 A1 | 1/2019 | Yi et al. | |
| 2019/0382866 A1 | 12/2019 | Yu et al. | |
| 2019/0390293 A1 | 12/2019 | Yu | |
| 2020/0385846 A1 | 12/2020 | Yu et al. | |
| 2021/0164079 A1 | 6/2021 | Yu et al. | |

FOREIGN PATENT DOCUMENTS

| | | |
|---|---|---|
| CN | 102534432 A | 7/2012 |
| CN | 103459634 A | 12/2013 |
| CN | 110100034 A | 8/2019 |
| EP | 2980257 A1 | 2/2016 |
| EP | 3446810 A1 | 2/2019 |
| JP | H08-41535 A | 2/1996 |
| JP | 2002020837 A * | 1/2002 |
| JP | 2007-092155 A | 4/2007 |
| JP | 2012-214890 A | 11/2012 |
| JP | 2016-505094 A | 2/2016 |
| JP | 2016-534230 A | 11/2016 |
| KR | 10-2012-0071614 A | 7/2012 |
| KR | 10-2014-0072180 A | 6/2014 |
| KR | 10-2016-0072099 A | 6/2016 |
| KR | 10-1736621 B1 | 5/2017 |
| KR | 10-2018-0073368 A | 7/2018 |
| KR | 10-2018-0073379 A | 7/2018 |
| WO | 2018/117481 A1 | 6/2018 |
| WO | 2019/125076 A1 | 6/2019 |

(Continued)

OTHER PUBLICATIONS

Sadasue et al., JP-2002020837-A Google Patents machine translation printed on Jul. 26, 20203, Jan. 23, 2002, entire translation (Year: 200).*

(Continued)

*Primary Examiner* — Katherine A Christy

(74) *Attorney, Agent, or Firm* — Morgan, Lewis & Bockius LLP

(57) ABSTRACT

A wear resistant steel material has high hardness and excellent cut crack reistance, that can be applied to a thick steel material of which the thickness is 60 mm or more, that is not cracked even after being cut using gas, and a method of manufacturing the wear resistant steel material provides high hardness and excellent cut crack resistance.

15 Claims, No Drawings

(56) References Cited

FOREIGN PATENT DOCUMENTS

WO  2019/125083 A1  6/2019

OTHER PUBLICATIONS

Office action issued in Chinese Application 202180014872.1 dated Mar. 1, 2023 with English Translation.
International Search Report dated Apr. 13, 2021 issued in International Patent Application No. PCT/KR2020/018392 (with English translation).
Office Action issued in corresponding Japanese Patent Application No. 2022-537685 dated Oct. 3, 2023.
Extended European Search Report dated Nov. 15, 2024, issued in corresponding European Patent Application No. 20901961.1.

* cited by examiner

WEAR RESISTANT STEEL MATERIAL WITH EXCELLENT CUT CRACK RESISTANCE AND METHOD OF MANUFACTURING SAME

CROSS-REFERENCE OF RELATED APPLICATIONS

This application is the U.S. National Phase under 35 U.S.C. § 371 of International Patent Application No. PCT/KR2020/018392, filed on Dec. 16, 2020, which in turn claims the benefit of Korean Application No. 10-2019-0170859, filed on Dec. 19, 2019, the entire disclosures of which applications are incorporated by reference herein.

TECHNICAL FIELD

The present disclosure relates to a wear resistant steel material that is not cracked even after being cut using gas, etc., and a method of manufacturing the wear resistant steel material.

BACKGROUND ART

Since wear due to friction may be generated excessively during working in construction machines and industrial machines that are used in many industrial fields such as the construction industry, civil engineering industry, the mining industry, and the cement industry, it is required to apply materials having wear resistance. In general, wear resistance and hardness are related to each other in thick steel sheets, it is required to increase the hardness of a thick steel sheet that has possibility of wear, and such a thick steel sheet is usually called wear resistant steel.

A wear resistant steel having high hardness is generally manufactured through hot rolling, reheating at Ac3 temperature or more, and then rapid cooling. A wear resistant steel manufactured through this process has a microstructure called martensite, which is a inherent characteristic of steel that can be obtained through phase transformation. A wear resistant steel having martensite as a main structure contains a large amount of carbon and alloy elements, so there is a problem that cracks are frequently generated after a material is actually cut to a desired size or shape.

Cracks that are generated after cutting are caused by hydrogen permeating in the material in cutting and it is possible to secure reliability of the material only when increasing resistance against hydrogen embrittlement. To this end, although there is a slight difference, depending on the thickness before cutting, a process of preheating a material at 100° C. or more is necessarily required. However, it takes a considerable time to preheat a material and it is very difficult to secure and maintain uniform temperature. Further, post-heating is applied to a cut surface, similar to preheating, to prevent cut cracks in some cases, but this is not efficient in terms of workability.

(Patent Document 1) Korean Patent Application No. 10-2015-0179009

DISCLOSURE

Technical Problem

An embodiment of the present disclosure provides a wear resistant steel material having high hardness and excellent cut crack resistance, and a method of manufacturing the wear resistant steel material.

The objectives of the present disclosure are not limited to that described above. Those skilled in the art may understand additional objectives of the present disclosure without difficulty from the general contents in the specification.

Technical Solution

An aspect of the present disclosure provides a wear resistant steel material that include, in percent by weight, carbon (C): 0.25~0.50%, silicon (Si): 0.15~0.5%, manganese (Mn):0.6~1.6%, phosphorous (P): 0.05% or less (excluding 0%), sulfur (S): 0.02% or less (excluding 0%), aluminum (Al): 0.07% or less (excluding 0%), chrome (Cr): 0.1~1.5%, molybdenum (Mo): 0.1~0.8%, niobium (Nb): 0.08% or less (excluding 0%), vanadium (V): 0.05~0.5%, boron (B): 50 ppm or less (excluding 0%), further includes one or more selected from a group of titanium (Ti): 0.02% less (excluding 0%), nickel (Ni): 0.5% less (excluding 0%), copper (Cu): 0.5% less (excluding 0%), and calcium (Ca): 2~100 ppm, includes Fe and unavoidable impurities as a balance, in which the wear resistant steel material satisfies the following Relation 1, a microstructure includes, in percent by area, tempered martensite of 90% or more, bainite of 10% or less, and martensite of 2% or less, and Brinell hardness is in the range of 360~440 HB.

$$([V] \times [Nb])/[Mo] \geq 6 \times 10^{-3} \qquad \text{[Relation 1]}$$

(in Relation 1, [V] is the content of V in the steel material in average percent by weight, [Nb] is the content of Nb in the steel material in average percent by weight, and [Mo] is the content of Mo in the steel material in average percent by weight).

Another aspect of the present disclosure provides a method of manufacturing a wear resistant steel material that includes: heating a steel slab having the alloy composition described above with a temperature range of 1050~1250° C.;

obtaining a roughing-milled bar by applying roughing milling on the reheated steel slab in a temperature range of 950~1050° C.;

obtaining a hot-rolled steel sheet by performing hot rolling on the roughing-milled bar in a temperature range of 850~950° C.;

cooling the hot-rolled steel sheet to a cooling end temperature of Ms-50° C. or less at an average cooling speed (cooling rate) of 3° C./s or more; and performing heat treatment on the cooled steel sheet at a temperature of 450~650° C. for 15 minutes or more.

Advantageous Effects

According to an embodiment of the present disclosure, it is possible to provide a wear resistant steel material having high hardness and excellent cut crack resistance, and a method of manufacturing the wear resistant steel material.

In particular, according to another embodiment of the present disclosure, even for thick steel materials of which the thickness is 60 mm or more, it is possible to provide a wear resistant steel material having high hardness and excellent cut crack resistance, and a method of manufacturing the wear resistant steel material.

BEST MODE

An aspect of the present disclosure provides a wear resistant steel material that includes, in percent by weight, carbon (C): 0.25~0.50%, silicon (Si): 0.15~0.5%, manganese (Mn): 0.6~1.6%, phosphorous (P): 0.05% or less (excluding 0%), sulfur (S): 0.02% or less (excluding 0%), aluminum (Al): 0.07% or less (excluding 0%), chrome (Cr): 0.1~1.5%, molybdenum (Mo): 0.1~0.8%, niobium (Nb): 0.08% or less (excluding 0%), vanadium (V): 0.05~0.5%, boron (B): 50 ppm or less (excluding 0%), further includes one or more selected from a group of titanium (Ti): 0.02% less (excluding 0%), nickel (Ni): 0.5% less (excluding 0%), copper (Cu): 0.5% less (excluding 0%), and calcium (Ca): 2~100 ppm, includes Fe and unavoidable impurities as a balance, and satisfies the following relation 1, in which a microstructure includes, in percent by area, tempered martensite of 90% or more, bainite of 10% or less, and martensite of 2% or less, and Brinell hardness is in the range of 360~440 HB.

$$(V \times Nb)/Mo \geq 6 \times 10^{-3}$$ [Relation 1]

(in Relation 1, [V] is the content of V in the steel material in average percent by weight, [Nb] is the content of Nb in the steel material in average percent by weight, and [Mo] is the content of Mo in the steel material in average percent by weight).

Hereafter, the reason of limiting the alloy composition of the wear resistant steel material with excellent cut crack resistance provided in the present disclosure, as described above, is described in detail. Meanwhile, the content of each element is based on percent by weight unless specifically stated in the present disclosure.

Carbon (C): 0.25~0.50%

Carbon (C) is an element that effectively increases hardness and efficiently improves hardenability in steel having martensite as a main structure. It is preferable to add carbon by 0.25% or more in order to sufficiently secure the effect described above, and if the content exceeds 0.50%, the possibility of breaking in a slab furnace in reheating of a thick plate manufacturing process increases. Accordingly, it is preferable to control the content of C at 0.25~0.50% in the present disclosure. Meanwhile, the lower limit of the content of C is more preferably 0.26%, much more preferably 0.28%, and the most preferably 0.29%. The upper limit of the content of C is more preferably 0.49%, much more preferably 0.48%, and the most preferably 0.47%.

Silicon (Si): 0.15~0.5%

Silicon (Si) is an element that effectively improves strength according to deoxidization and solution strengthening. It is preferable to add Si by 0.15% or more in order to efficiently obtain the effect described above. However, when the content exceeds 0.5%, a scale may be excessively produced in hot rolling, so it is not preferable. Accordingly, it is preferable to control the content of Si at 0.15~0.5% in the present disclosure. The lower limit of the content of Si is more preferably 0.16%, much more preferably 0.18%, and the most preferably 0.20%. The upper limit of the content of Si is more preferably 0.48%, much more preferably 0.46%, and the most preferably 0.45%.

Manganese (Mn): 0.6.0~1.6%

Manganese (MN) is an element that suppresses production of ferrite and improves strength and toughness of steel by effectively increasing hardenability by decreasing Ar3 temperature. It is preferable to add Mn by 0.6% or more in order to efficiently obtain the effect described above. However, when the content of Mn exceeds 1.6&, there is a problem that MnS segregation is easily generated at the thickness center, so cracks are easily generated. Accordingly, it is preferable to control the content of Mn at 1.6% or less in the present disclosure. The lower limit of the content of Mn is more preferably 0.63%, much more preferably 0.65%, and the most preferably 0.70%. The upper limit of the content of Mn is more preferably 1.58%, much more preferably 1.55%, and the most preferably 1.50%.

Phosphorous (P): 0.05% or Less (Excluding 0%)

Phosphorous (P) is an element that is unavoidably contained in steel and decreases toughness of steel. Accordingly, it is preferable to reduce and control the content of P at 0.05% or less, and the upper limit of the content of P may be more preferably 0.03% and the most preferably 0.015%. However, in consideration of the unavoidably contained level, 0% may be excluded from the content of P, or the lower limit of the content of P may be 0.001%.

Sulfur (S): 0.02% or Less (Excluding 0%)

Sulfur (S) is an element that decreases toughness of steel by producing a MnS inclusion in steel. Accordingly, it is preferable to reduce and control the content of S as low as possible at 0.02%, and more preferably, the upper limit of the content of S may be 0.009%. However, in consideration of the unavoidably contained level, 0% may be excluded from the content of S, or the lower limit of the content of S may be 0.0005%.

Aluminum (Al): 0.07% or Less (0% Excluded)

Aluminum (Al) is an element that effectively reduces the content of oxygen in molten steel as deoxidizer of steel. However, if the content of Al exceeds 0.07%, there is a problem that cleanness of steel is decreased, so it is not preferable. Accordingly, it is preferable, in the present disclosure, control the content of Al at 0.07% or less, more preferably, the upper limit of the content of Al may be 0.06%, much more preferably, the upper limit of the content of Al may be 0.05%, and the most preferably, the upper limit of the content of Al may be 0.04%. However, in consideration of load in the steel manufacturing process and an increase of the manufacturing cost, 0% may be excluded from the content of Al, or the lower limit of the content of Al may be 0.005%.

Chrome (Cr): 0.1~1.5%

Chrome (Cr) is an element that increases strength of steel by increasing hardenability and that is also advantageous in securing hardness. It is preferable to add Cr by 0.1% or more in order to achieve the effect described above, but if the content exceeds 1.5%, hardenability excessively increases, the possibility of cracks that are generated on the surface of a solidified piece in casting increases. Accordingly, it is preferable to control the content of Cr at 0.1~1.5% in the present disclosure. The lower limit of the content of Cr is more preferably 0.12%, much more preferably 0.15%, and the most preferably 0.20%. The upper limit of the content of Cr is more preferably 1.4%, much more preferably 1.3%, and the most preferably 1.2%.

Molybdenum (Mo): 0.1~0.8%

Molybdenum (Mo) is an element that increases hardenability of steel and is very useful to secure strength at a high temperature of 500° C. or more by producing a microcarbide ($Mo_2C$) at a high temperature. It is preferable to add Mo by 0.1% or more in order to sufficiently achieve the effect described above. However, since Mo is a slightly expensive element, there is a problem that the manufacturing cost increases when the content thereof exceeds 0.8%. Accordingly, it is preferable to control the content of Mo at 0.1~0.8% in the present disclosure. Alternatively, the content of Mo may be more preferably 0.2% or more and much more preferably 0.3%. Further, the content of Mo may be more preferably 0.7% or less and much more preferably 0.63%.

Niobium (Nb): 0.08% or Less (Excluding 0%)

Niobium (Nb) increases hardenability of austenite by being solidified in austenite, increases strength of steel by producing carbonitrides such as Nb (C, N) at a high temperature, and suppresses growth of austenite grains. However, when the content of Nb exceeds 0.08%, a coarse precipitate is produced, which causes a problem of decreasing toughness by causing brittle facture. Accordingly, it is preferable to control the content of Nb at 0.08% or less in the present disclosure. Alternatively, the content of Nb may be more preferably 0.07% or less, much more preferably 0.06% or less, and the most preferably 0.05% or less.

Meanwhile, since the present disclosure can secure the effect described above by adding Nb, the content of Nb may exclude 0% (i.e., may exceed 0%). However, the content of Nb may be more preferably 0.001% or more, much more preferably 0.005% or more, and the most preferably 0.01% or more.

Vanadium (V): 0.05~0.5%

Vanadium (V) is an element that is advantageous in suppressing growth of austenite grains by producing VC carbides in reheating after hot rolling and in securing strength by improving hardenability of steel. It is preferable to add V by 0.05% or more in order to sufficiently achieve the effect described above. However, since V is a slightly expensive element, there is a problem that the manufacturing cost increases when the content thereof exceeds 0.5%. Accordingly, it is preferable to control the content of V at 0.5% or less when adding V in the present disclosure. Meanwhile, the lower limit of the content of Mo is more preferably 0.06%, much more preferably 0.07%, and the most preferably 0.08%. The upper limit of the content of V is more preferably 0.4%, much more preferably 0.35%, and the most preferably 0.3% or less.

Boron (B): 50 ppm or Less (Excluding 0%)

Boron (B) is an element that efficiently improves strength by effectively increase hardenability of steel even if it is added in a small amount. Since B shows the effect described above even if it is added in a small amount, the content of B may exclude 0% (i.e., may exceed 0%), and more preferably, the lower limit of the content of B may be 0.0005%. However, when the content of B is excessive, there is a problem that toughness and weldability of steel are decreased, so it is preferable to control the content thereof at 50 ppm or less (0.005% ore less). Accordingly, it is preferable that the content of B is 50 ppm or less (excluding 0%). The content of B is more preferably 40 ppm or less, much more preferably 35 ppm, and the most preferably 30 ppm.

Meanwhile, the wear resistant steel material according to an embodiment of the present disclosure may further include one or more elements additionally selected from the following elements other than the elements described above.

Titanium (Ti): 0.02% or Less (0% Excluded)

Titanium (Ti) is an element that maximizes the effect of B that is an element that efficiently improves hardenability of steel. In detail, Ti can maximize hardenability by increasing B, which is solidified, by suppressing production of BN by producing a TiN precipitate by being bonded to nitride (N). In order to achieve the effect described above, 0% may be excluded from the content of Ti, and more preferably, the lower limit of the content of Ti may be 0.005%. However, if the content of Ti exceeds 0.02%, a coarse TiN precipitate is produced, so there is a problem that toughness of steel is deteriorated. Accordingly, it is preferable to control the content of Ti at 0.02% or less in the present disclosure. Alternatively, the content of Ti may be more preferably 0.017% or less, much more preferably 0.015%, and the most preferably 0.012%.

Nickel (Ni) 0.5% or Less (Excluding 0%)

Nickel (Ni) is an element that generally efficiently improves toughness in addition to strength of steel. Accordingly, in order to achieve the effect described above, 0% may be excluded from the content of Ni, and more preferably, the lower limit of the content of Ni may be 0.01%. However, since Ni is an expensive element, if the content thereof exceeds 0.5%, it causes an increase of the manufacturing cost. Accordingly, it is preferable to control the upper limit of Ni at 0.5% in the present disclosure, and the content of Ni may be more preferably 0.47%, much more preferably 0.45%, and the most preferably 0.42%.

Copper (Cu): 0.5% or Less (Excluding 0%)

Copper (Cu) is an element that improve strength and hardness of steel through solution strengthening. Further, copper is an element that efficiently improves toughness together with Ni. In order to achieve the effect described above, 0% may be excluded from the content of Cu, and more preferably, the lower limit of the content of Cu may be 0.01%. However, if the content of Cu exceeds 0.5%, there is a problem that a surface defect of a slab may be generated in high-temperature heating before hot rolling and the quality in hot rolling is decreased, so it is preferable to add Cu at 0.5% or less when adding Cu. Alternatively, the upper limit of the content of Cu may be more preferably 0.4%, much more preferably 0.35%, and the most preferably 0.3%.

Calcium (Ca): 2~100 ppm

Calcium (Ca) has an effect of suppressing production of NnS precipitated at the thickness center of a steel material by producing CaS because it bonds to S well. As a result, adding Ca reduces mechanical anisotropy of a material. It is preferable to add Ca by 2 ppm or more in order to achieve the effect described above, but if the content exceeds 100 ppm, there is a problem that nozzle clogging is caused in a steel manufacturing process. Accordingly, it is preferable to control the content of Ca at 2~100 ppm (i.e., 0.0002~0.01%) in the present disclosure. The lower limit of the content of Ca is more preferably 2.5 ppm, much more preferably 3 ppm, and the most preferably 3.5 ppm. The upper limit of the content of Ca is more preferably 80 ppm, much more preferably 60 ppm, and the most preferably 40 ppm.

The balance is steel (F) in the present disclosure. However, since unintended impurities may be unavoidably mixed from a raw material or a surrounding environment in a common manufacturing process, it cannot be excluded. Since anyone of those skilled in a common manufacturing process can know such impurities, they are not all specifically stated therein.

Further, according to the present disclosure, the steel material satisfies the following Relation 1. The steel material according to the present disclosure includes V, Nb, and Mo as necessary constituent, and it any one of these constituent is not included, the target effects of the present disclosure cannot be achieved. In addition, since the composition of the steel material according to the present disclosure satisfies the following Relation 1, the target effect of excellent cut crack resistance of the present disclosure can be shown.

$$([V] \times [Nb])/[Mo] \geq 6 \times 10^{-3}$$ [Relation 1]

(in Relation 1, [V] is the content of V in the steel material in average percent by weight, [Nb] is the content of Nb in the steel material in average percent by weight, and [Mo] is the content of Mo in the steel material in average percent by weight).

Meanwhile, according to an aspect of the present disclosure, in order to further improve the cut crack resistance described above, more preferably, the value of $([V] \times [Nb])/[Mo]$ defined in Relation 1 may be 0.008 or more and 0.025 or less. Since Relation 1 is obtained through experiences, units may not be specifically determined, and it is enough herein as long as the units of [V], [Nb], and [Mo] (i.e., percent by weight) are satisfied.

According to an embodiment of the present disclosure, it is preferable that the microstructure of the steel material includes tempered martensite as a main structure (i.e., includes, in percent by area, tempered martensite of 50% or more, and more preferably 90% or more). Accordingly, the steel material of the present disclosure can secure high hardness and cut crack resistance too that prevents cracks after cutting using gas, etc., and particularly, a thick steel material of 60 mm or more can also secure high hardness and excellent cut crack resistance.

That is, since the possibility of cut cracks is generally relatively low in thin wear resistant steel, so tempering was not performed in the related art. However, when the thickness of such wear resistant steel increases over 60 mm, cut cracks are more easily generated, and in the related art, it was impossible to achieve both excellent hardness and cut crack resistance without preheating or post-heating in a thick steel material of which the thickness is 60 mm or more. Accordingly, the inventors, as the result of assiduous examination, have found out that it is possible to secure excellent hardness and cut crack resistance even in a thick steel material by controlling a microstructure while satisfying the alloy composition described above, thereby finally completing the present disclosure.

According to an embodiment of the present disclosure, as for the fraction of the tempered martensite structure, since a bainite structure may be unavoidably produced in a partial area during rapid cooling due to the thickness of a material in manufacturing, the upper limit of the fraction of the bainite structure is limited to 10%. That is, it is preferable that the microstructure of the present disclosure includes, in percent by area, tempered martensite of 90% or more, bainite of 10% or less, and martensite of 2% or less.

If the fraction of the tempered martensite is less than 90% in percent by area, there is a problem that it is difficult to secure sufficient crack resistance after gas cutting, and the lower limit of the fraction of the tempered martensite is more preferably 92% or more in percent by area, and much more preferably 95% or more in percent by area. It is preferable that the fraction of the bainite is more preferably 8% or less in percent by area and much more preferably 5% or less in percent by area.

Meanwhile, according to an aspect of the present disclosure, the tempered martensite structure is, in percent by area, more preferably 90% or more and 98% or less, and the bainite structure is 2% or more and 10% or less.

According to an aspect of the present disclosure, the steel material may include, in percent by area, tempered martensite of 90% or more and bainite of 10% or less, as a microstructure, and may further include martensite that is the balance as an other phase.

Therefore, according to an aspect of the present disclosure, the steel material may include, as a microstructure, in percent by area, tempered martensite of 90% or more and 98% or less, bainite of 2% or more and 10% or less, and martensite of 2% or more (including 0%).

Meanwhile, according to an aspect of the present disclosure, the steel material of the present disclosure may include micro-carbides and such micro-carbides may improve both strength and hydrogen embrittlement resistance of steel. That is, hydrogen permeating into a material through gas cutting causes delay breaking generally through a predetermined incubation period of 24~48 hours, and micro-carbides increase resistance against delay breaking.

In more detail, micro-carbides indirectly or directly act as a trapping site of hydrogen and carbides such as Nb, Ti, V, and Mo effectively increase hydrogen embrittlement resistance in a steel material having tempered martensite as a base structure. For reference, the sizes of the micro-carbides described above are several to tens of nm and are slight different, depending on added elements.

Further, according to an aspect of the present disclosure, it is preferable to have Nb-based and V-based micro-carbides as the micro-carbides.

According to an aspect of the present disclosure, Brinell hardness of the wear resistant steel material has a grade of about 360~440 HB and satisfies a Brinell hardness range of 360~440 HB that is the target hardness range as a wear resistant steel material, whereby it is possible to achieve a steel material having both excellent hardness and crack resistance intended in the present disclosure.

Another embodiment of the present disclosure provides a method of manufacturing a wear resistant steel material that includes: heating a steel slab having the alloy composition described above with a temperature range of 1050~1250° C.; obtaining a roughing-milled bar by applying roughing milling on the reheated steel slab in a temperature range of 950~1050° C.; obtaining a hot-rolled steel sheet by performing hot rolling on the roughing-milled bar in a temperature range of 850~950° C.; cooling the hot-rolled steel sheet to Ms-50° C. or less at an average cooling speed of 3° C./s or more; and performing heat treatment on the cooled steel sheet at a temperature of 450~650° C. for 15 minutes or more.

Hereafter, a method of manufacturing a high-hardness wear resistant steel material with excellent cut crack resistance of the present disclosure is described in detail.

First, a steel slab having the alloy composition described above is heated in a temperature range of 1050~1250° C. When the slab heating temperature is less than 1050° C., re-solidification of Nb, etc. is not sufficient, but when the temperature exceeds 1250° C., austenite grains are coarsened, so there is a possibility that a non-uniform structure is formed. Accordingly, it is preferable in the present disclosure that the heating temperature of the steel slab has a range of 1050~1250° C. The lower limit of the heating temperature of the steel slab is more preferably 1065° C., much more preferably 1080° C., and the most preferably 1100° C. The upper limit of the heating temperature of the steel slab is more preferably 1220° C., much more preferably 1200° C., and the most preferably 1180° C.

A roughing-milled bar is obtained by performing roughing milling on the reheated steel slab in a temperature range of 950~1050° C. When temperature is less than 950° C. in roughing milling, the rolling load increases, reduction is relatively small. Accordingly, deformation is not sufficiently transmitted to the center in the width direction of the slab, so a defect such as apertures may not be removed. However, when the temperature exceeds 1050° C., recrystallization is generated simultaneously with rolling and then the grains grow, so there is a possibility that the initial austenite grains are excessively coarsened. According, it is preferable in the present disclosure that the roughing milling temperature is 950~1050° C. The lower limit of the roughing milling temperature is more preferably 960° C., much more preferably 970° C., and the most preferably 980° C. The upper limit of the roughing milling temperature is more preferably 1045° C., much more preferably 1040° C., and the most preferably 1035° C.

A hot-rolled steel sheet is obtained by performing the roughing-milled bar in a temperature range of 850~950° C. When the hot-rolling temperature is less than 850° C., it becomes 2-phase region rolling, so there is a possibility that ferrite is produced in the microstructure. However hen the hot-rolling temperature exceeds 950° C., bainite may be excessively produced due to a relatively high cooling speed even during air cooling. According, it is preferable in the present disclosure that the hot-rolling temperature is 850~950° C. Meanwhile, the lower limit of the hot-rolling temperature is more preferably 860° C., much more preferably 870° C., and the most preferably 880° C. The upper limit of the hot-rolling temperature is more preferably 940° C., much more preferably 930° C., and the most preferably 920° C.

According to an aspect of the present disclosure, the method may further include performing air cooling on the hot-rolled steel sheet obtained through the hot rolling. Further, the method may further include reheating the hot-rolled steel sheet at a temperature of Ac+30° C. or more (more preferably, in a range of 890~920° C.) on the basis of the surface temperature of the hot-rolled steel sheet. In this case, the residence time of the reheating may be in the range of 100~160 minutes (more preferably, 106~151 minutes).

Thereafter, the hot-rolled steel sheet is cooled to a cooling end temperature of Ms-50° C. or less (from a cooling start temperature of Ac3+30° C. or more) at an average cooling speed of 3° C./s (preferably, 3~20° C./s and more preferably 3.2~10.1° C./s) on the basis of the temperature surface of the hot-rolled steel sheet. In this case, it is preferable that the cooling is rapid cooling that uses water at 30° C. or less.

In the cooling, when the average cooling speed is less than 3° C./s or the cooling end temperature exceeds Ms-50° C., a ferrite phase is formed during cooling of a bainite phase may be excessively formed. Accordingly, it is preferable that the cooling is performed to Ms-50° C. or less at an average cooling speed of 3° C./s or more. The higher the cooling speed, the more it is advantageous in forming a desired microstructure of the present disclosure, but when the thickness increases over 60 mm, the cooling speed in the material necessarily physically increases. Meanwhile, the upper limit of the cooling speed is not specifically limited in the present disclosure and may be appropriately set in consideration of the facility limitation by those skilled in the art.

Meanwhile, though not specifically limited, according to an aspect of the present disclosure, in the cooling, the cooling end temperature may be more preferably Ms-80° C. or less (much more preferably Ms-100° C. or less, and the most preferably Ms-150° C. or less).

Post-heat treatment is performed on the hot-rolled steel sheet that has undergone rapid cooling at 450~650° C. to secure the finally intended hardness and cut crack resistance. That is, desired hardness of 360~440 HB can be secured through the post-heat treatment generally called tempering.

In detail, the hot-rolled steel sheet rapidly cooled before post-heat treatment contains a large amount of carbon, so it exceeds the upper limit of hardness of 440 HB intended in the present disclosure, so cut crack resistance cannot be secured. Accordingly, in the present disclosure, the dislocation density in the material is reduced through tempering, whereby hardness is adjusted and micro-carbides of alloy elements such as Nb and V, which are added in a very small amount, are precipitated. Accordingly, cut crack resistance can be secured.

Accordingly, it is preferable to perform the post-heat treatment at 450~650° C. The post-heat treatment temperature is more preferably 460° C. or more, much more preferably 480° C. or more, and the most preferably 489° C. or more.

Further, the post-heat treatment temperature is more preferably 640° C., much more preferably 620° C., and the most preferably 600° C.

According to an aspect of the present disclosure, it is preferable that the residence time in the post-heat treatment temperature is 15 minutes or more. If the residence time is less than 15 minutes, considering the thickness of the material, temperature does not sufficiently increases at the center portion, so the dislocation density decreases and the micro-carbide precipitation effect is insufficient. Further, when the residence time exceeds 50 minutes, hardness remarkably decreases, to the desired level cannot be satisfied.

Accordingly, it is preferable that the residence time of the post-heat treatment is 15~50 minutes. Meanwhile, the residence time is more preferably 16 minutes or more, much more preferably 17 minutes or more, and the most preferably 19 minutes or more. Further, the residence time is more preferably 48 minutes or less, much more preferably 45 minutes or less, and the most preferably 41 minutes or less.

Mode for Invention

Hereafter, the present disclosure is described in more detail with reference to an embodiment. However, it should be noted that the following embodiments are provided only to describe the present disclosure in more detail through exemplification rather than limiting the right range of the present disclosure. This is because the right range of the present disclosure is determined the matters described in claims and matters reasonably inferred from the matters.

EMBODIMENT

A steel slab having the alloy compositions of the following Tables 1 and 2 was prepared, and heating-roughing mill-hot rolling-cooling (room temperature; air cooling)—reheating-cooling-post heat treatment were performed on the steel slab under the conditions of the following Table 3, whereby a hot-rolled steel sheet was manufactured. Microstructure and mechanical properties of the hot-rolled steel sheet ware measured and then shown in the following Table 4.

In this case, as the microstructure, slopes were formed by cutting specimens were cut a certain size, was etched using a nital etching solution, and was then observed at ½ t position that is a thickness center using an optical microscope and a scanning electron microscope.

Hardness was measured using a Brinell hardness tester (load of 3000 kgf and tungsten input of 10 mm), decarburized layers were removed by milling the sheet surfaces by 2 mm in the thickness direction, and then average values of three-time measurement values were used.

Meanwhile, as for whether cut cracks were generated, hot-rolled steel sheets having the alloy compositions described in the following Tables 1 and 2 and having the thicknesses described in the following Table 3 were prepared, common gas cutting, which uses oxygen gas, was performed under non-preheating condition (there was no preheating), and then the cut materials were left at room temperature for 48 hours. This is for checking whether delay breaking, which is not observed immediately after cutting due to hydrogen entering cut portions in cutting, was generated. Whether cut cracks were generated was evaluated through a method of visually checking first cut surfaces and then rechecking microcracks through an optical microscope, and the result was shown in Table 4.

TABLE 1

| 구분 | alloy composition (percent by weight) | | | | | | | | | |
|---|---|---|---|---|---|---|---|---|---|---|
| | C | Si | Mn | P | S | Al | Cr | Mo | V | Nb |
| CS 1 | 0.26 | 0.35 | 1.42 | 0.011 | 0.002 | 0.03 | 0.61 | 0.25 | 0.12 | — |
| CS 2 | 0.17 | 0.15 | 0.93 | 0.015 | 0.003 | 0.03 | 0.27 | — | 0.13 | 0.02 |
| CS 3 | 0.43 | 0.25 | 0.65 | 0.012 | 0.001 | 0.02 | 0.45 | 0.11 | — | 0.03 |
| CS 4 | 0.31 | 0.29 | 1.21 | 0.009 | 0.002 | 0.03 | 0.38 | 0.35 | 0.07 | 0.02 |
| IS 1 | 0.36 | 0.28 | 1.22 | 0.008 | 0.004 | 0.03 | 0.72 | 0.63 | 0.12 | 0.04 |
| IS 2 | 0.29 | 0.31 | 1.05 | 0.012 | 0.003 | 0.03 | 0.53 | 0.42 | 0.09 | 0.05 |
| IS 3 | 0.47 | 0.24 | 1.36 | 0.009 | 0.003 | 0.02 | 0.29 | 0.61 | 0.23 | 0.03 |
| IS 4 | 0.32 | 0.17 | 1.44 | 0.007 | 0.005 | 0.03 | 0.45 | 0.52 | 0.32 | 0.04 |
| IS 5 | 0.44 | 0.22 | 1.17 | 0.008 | 0.004 | 0.02 | 0.61 | 0.47 | 0.16 | 0.05 |

IS*: Inventive Steel
CS*: Comparative STEEL

TABLE 2

| items | alloy composition (percent by weight) | | | | | |
|---|---|---|---|---|---|---|
| | Ti | B | Ni | Cu | Ca | (V*Nb)/Mo |
| CS 1 | 0.018 | 0.0015 | 0.32 | 0.21 | 0.0005 | Nb was not added |
| CS 2 | 0.001 | 0.0018 | 0.05 | 0.01 | 0.0002 | Mo was not added |
| CS 3 | 0.012 | 0.0023 | 0.11 | 0.01 | 0.0007 | V was not added |
| CS 4 | 0.017 | 0.0014 | 0.27 | — | — | 0.004 |
| IS 1 | 0.012 | 0.0017 | 0.24 | 0.13 | 0.0009 | 0.008 |
| IS 2 | 0.011 | 0.0019 | — | — | — | 0.011 |
| IS 3 | — | 0.0021 | 0.42 | — | — | 0.011 |
| IS 4 | — | 0.0015 | — | — | 0.0011 | 0.025 |
| IS 5 | — | 0.0018 | — | 0.05 | — | 0.017 |

TABLE 3

| items | Steel No. | slab heating temperature (° C.) | roughing milling temperature (° C.) | finish hot-rolling temperature (° C.) | reheating temperature (° C.) | reheating residence time (min) (분) | cooling speed (° C./s) | cooling end temperature (° C.) | post-heat treatment temperature (° C.) | post-heat treatment residence time (min) | thickness (mm) |
|---|---|---|---|---|---|---|---|---|---|---|---|
| CE 1 | CS 1 | 1156 | 1022 | 890 | 911 | 36 | 9.8 | 128 | 538 | 26 | 50 |
| CE 2 | | 1175 | 1015 | 871 | 910 | 95 | 12.9 | 53 | — | — | 60 |
| CE 3 | | 1153 | 1034 | 915 | 901 | 125 | 4.4 | 33 | 354 | 36 | 80 |
| CE 4 | CS 2 | 1162 | 1033 | 913 | 899 | 113 | 5.1 | 22 | — | — | 70 |
| CE 5 | | 1143 | 1010 | 872 | 916 | 102 | 8.6 | 25 | 587 | 39 | 60 |
| CE 6 | | 1144 | 989 | 886 | 915 | 55 | 15.3 | 43 | 469 | 16 | 50 |
| CE 7 | CS 3 | 1164 | 1031 | 884 | 898 | 97 | 9.1 | 27 | 545 | 33 | 60 |

TABLE 3-continued

| items | Steel No. | slab heating temperature (° C.) | roughing milling temperature (° C.) | finish hot-rolling temperature (° C.) | reheating temperature (° C.) | reheating residence time (min) | cooling speed (° C./s) | cooling end temperature (° C.) | post-heat treatment temperature (° C.) | post-heat treatment residence time (min) | thickness (mm) |
|---|---|---|---|---|---|---|---|---|---|---|---|
| CE 8 | | 1134 | 1012 | 920 | 904 | 113 | 7.7 | 211 | 509 | 39 | 70 |
| CE 9 | | 1136 | 1035 | 938 | 914 | 151 | 2.8 | 32 | — | — | 100 |
| CE 10 | CS 4 | 1120 | 1032 | 919 | 905 | 108 | 4.9 | 38 | 532 | 29 | 70 |
| CE 11 | | 1127 | 1027 | 896 | 908 | 124 | 4.5 | 24 | 497 | 33 | 80 |
| CE 12 | | 1129 | 1023 | 888 | 891 | 130 | 5.2 | 21 | 562 | 25 | 80 |
| CE 13 | IS 1 | 1134 | 1011 | 911 | 914 | 107 | 7.5 | 25 | 275 | 32 | 70 |
| IE 1 | | 1120 | 1017 | 899 | 898 | 119 | 7.2 | 41 | 505 | 35 | 70 |
| IE 2 | | 1149 | 1024 | 883 | 911 | 125 | 5.6 | 32 | 521 | 29 | 80 |
| IE 3 | IS 2 | 1131 | 1010 | 884 | 909 | 106 | 10.1 | 27 | 503 | 21 | 60 |
| CE 14 | | 1142 | 1026 | 901 | 911 | 124 | 4.2 | 17 | 512 | 12 | 80 |
| IE 4 | | 1153 | 1031 | 907 | 906 | 151 | 3.2 | 30 | 509 | 37 | 100 |
| IE 5 | IS 3 | 1116 | 1004 | 899 | 910 | 109 | 6.8 | 29 | 552 | 25 | 70 |
| IE 6 | | 1131 | 1016 | 913 | 908 | 129 | 4.6 | 26 | 570 | 19 | 80 |
| CE 15 | | 1112 | 1029 | 918 | 902 | 134 | 3.7 | 24 | 667 | 60 | 90 |
| IE 7 | IS 4 | 1119 | 1022 | 912 | 913 | 111 | 6.3 | 40 | 500 | 34 | 70 |
| IE 8 | | 1125 | 1025 | 900 | 900 | 130 | 5.7 | 22 | 489 | 41 | 80 |
| IE 9 | IS 5 | 1150 | 1031 | 895 | 907 | 126 | 4.9 | 23 | 551 | 35 | 80 |

CE*: comparative example
IE*: invention example $Ac3^* = 910 - 203 \times C^{1/2} - 15.2 \times Ni + 44.7 \times Si + 104 \times V + 31.5 \times Mo + 13.1 \times WMs^* = 539 - 423 \times C - 30.4 \times Mn - 17.7 \times Ni - 12.1 \times Cr - 7.5 \times Mo$

TBALE 4

| items | microstructure (percent by area) Temp. M | others | surface hardness (HB) | cut crack |
|---|---|---|---|---|
| CE 1 | 94 | B: 6 | 312 | Cracked |
| CE 2 | 0 | M: 97, B: 3 | 506 | Cracked |
| CE 3 | 75 | M: 20, B: 5 | 419 | Cracked |
| CE 4 | 0 | M: 98, B: 2 | 433 | cracked |
| CE 5 | 98 | B: 2 | 289 | not cracked |
| CE 6 | 95 | B: 5 | 347 | not cracked |
| CE 7 | 93 | B: 7 | 423 | Cracked |
| CE 8 | 94 | B: 6 | 438 | Cracked |
| CE 9 | 0 | M: 98, B: 2 | 653 | Cracked |
| CE 10 | 96 | B: 4 | 412 | Cracked |
| CE 11 | 95 | B: 5 | 404 | Cracked |
| CE 12 | 94 | B: 6 | 396 | Cracked |
| CE 13 | 67 | M: 25, B: 8 | 512 | not cracked |
| IE 1 | 96 | B: 4 | 404 | not cracked |
| IE 2 | 97 | B: 3 | 399 | not cracked |
| IE 3 | 95 | B: 5 | 423 | not cracked |
| CE 14 | 59 | M: 37, B: 4 | 455 | Cracked |
| IE 4 | 98 | B: 2 | 386 | not cracked |
| IE 5 | 98 | B: 2 | 432 | not cracked |
| IE 6 | 92 | M: 2, B: 6 | 411 | not cracked |
| CE15 | 100 | — | 282 | not cracked |
| IE 7 | 98 | B: 2 | 421 | not cracked |
| IE 8 | 97 | B: 3 | 415 | not cracked |
| IE 9 | 98 | B: 2 | 400 | not cracked |

Temp. M: tempered martensite,
M: martensite,
B: bainite

As can be seen from Tables 1 to 4, in the comparative examples 1~15 that do not satisfy even any one of the alloy compositions and manufacturing conditions determined in the present disclosure, the surface hardness came out of Brinell hardness of 360~440 HB that is the target range of the present disclosure, so a steel material having hardness at the grade intended in the present disclosure could not be obtained, and/or cut cracks were generated. However, in the invention examples 1 to 9 that satisfy all of the alloy compositions and manufacturing conditions determined in the present disclosure, Brinell hardness of 360~440 HB that was the target hardness range of the present disclosure was satisfied, and there was not cut crack. Accordingly, it was found that when the alloy compositions and manufacturing conditions determined in the present disclosure are all satisfied, even thick steel materials of which the thickness of 60 mm or more can have both target excellent hardness and cut crack resistance.

The invention claimed is:

1. A wear resistant steel plate comprising,
in percent by weight, carbon (C): 0.25 to 0.50%, silicon (Si): 0.15 to 0.5%, manganese (Mn): 0.6 to 1.6%, phosphorous (P): 0.05% or less (excluding 0%), sulfur (S): 0.02% or less (excluding 0%), aluminum (Al): 0.07% or less (excluding 0%), chromium (Cr): 0.1 to 1.5%, molybdenum (Mo): 0.1~0.8%, niobium (Nb): 0.08% or less (excluding 0%), vanadium (V): 0.16 to 0.5%, boron (B): 50 ppm or less (excluding 0%), further includes one or more selected from a group of titanium (Ti): 0.02% or less (excluding 0%), nickel (Ni): 0.5% or less (excluding 0%), copper (Cu): 0.5% or less (excluding 0%), and calcium (Ca): 2 to 100 ppm, includes Fe and unavoidable impurities as a balance,
wherein the wear resistant steel plate satisfies Relation 1, a microstructure includes, in percent by area, tempered martensite of 90% or more and 98% or less, bainite of 2% or more and 10% or less, and martensite of 2% or less (including 0%), and Brinell hardness of any formed product of the wear resistant steel plate is in a range of 360 to 440 HB, and the Brinell hardness is determined according to a method using a Brinell hardness tester (load of 3000 kgf and tungsten input of 10 mm), $([V] \times [Nb])/[Mo] \geq 6 \times 10^{-3}$      [Relation 1]

where [V] is the content of V in the wear resistant steel plate in percent by weight, [Nb] is the content of Nb in the wear resistant steel plate in percent by weight, [Mo] is the content of Nb in the wear resistant steel plate in percent by weight, and [Mo] is the content of Mo in the wear resistant steel plate in percent by weight.

2. A wear resistant steel plate of claim 1, wherein a thickness of the wear resistant steel plate is 60 mm or more.

3. The wear resistant steel plate of claim 1, wherein the wear reistant steel plate comprises, in percent by weight, carbon (C): 0.29 to 0.47%.

4. The wear resistant steel plate of claim 1, wherein the wear resistant steel plate comprises, in percent by weight, silicon (Si): 0.20 to 0.45%.

5. The wear resistant steel plate of claim 1, wherein the wear resistant steel plate comprises, in percent by weight, manganese (Mn): 0.70 to 1.50%.

6. The wear resistant steel plate of claim 1, wherein the wear resistant steel plate comprises, in percent by weight, phosphorous (P): 0.015% or less (excluding 0%).

7. The wear resistant steel plate of claim 1, wherein the wear resistant steel plate comprises, in percent by weight, sulfur (S): 0.009% or less (excluding 0%).

8. The wear resistant steel plate of claim 1, wherein the wear resistant steel plate comprises, in percent by weight, aluminum (Al): 0.04% or less (excluding 0%).

9. The wear resistant steelplate of claim 1, wherein the wear resistant steel plate comprises, in percent by weight, chromium (Cr): 0.2 to 1.2%.

10. The wear resistant steel plate of claim 1, wherein the wear resistant steel plate comprises, in percent by weight, molybdenum (Mo): 0.3 to 0.63%.

11. The wear resistant steel plate of claim 1, wherein the wear resistant steel plate comprises, in percent by weight, vanadium (V): 0.12 to 0.3%.

12. The wear resistant steel plate of claim 1, wherein the wear resistant steel plate comprises, in percent by weight, titanium (Ti): 0.012% or less (excluding 0%).

13. The wear resisstant steel plate of claim 1, wherein the wear resistant steel plate comprises, in percent by weight, nickel (Ni): 0.42% or less (excluding 0%).

14. The wear resistant steel plate of claim 1, wherein the wear resistant steel plate comprises, in percent by weight copper (Cu): 0.3% or less (excluding 0%).

15. The wear resistant steel plate of claim 1, wherein the wear resistant steel plate comprises, in percent by weight, vanadium (V): 0.23 to 0.5%.

* * * * *